Oct. 4, 1932. C. CAMPBELL Re. 18,611

TOTAL TAKING DEVICE

Original Filed Jan. 22, 1926 3 Sheets-Sheet 1

Inventor
Charles Campbell
By his Attorney
W. M. Wilson

Oct. 4, 1932. C. CAMPBELL Re. 18,611

TOTAL TAKING DEVICE

Original Filed Jan. 22, 1926 3 Sheets-Sheet 2

Inventor
Charles Campbell
By his Attorney
W. Mc Wilson

Oct. 4, 1932. C. CAMPBELL Re. 18,611

TOTAL TAKING DEVICE

Original Filed Jan. 22, 1926 3 Sheets-Sheet 3

Reissued Oct. 4, 1932

Re. 18,611

UNITED STATES PATENT OFFICE

CHARLES CAMPBELL, OF LONDON, ENGLAND, ASSIGNOR TO THE TABULATING MACHINE COMPANY, OF ENDICOTT, NEW YORK, A CORPORATION OF NEW JERSEY

TOTAL TAKING DEVICE

Original No. 1,681,152, dated August 14, 1928, Serial No. 82,933, filed January 22, 1926, and in Great Britain February 4, 1925. Application for reissue filed March 27, 1929. Serial No. 350,419.

This invention pertains to record controlled tabulating machines, being an improvement on the machine disclosed in Canadian Patent No. 247,815, March 17, 1925, issued to F. M. Carroll, and copending United States application Serial No. 607,847, filed December 19, 1922, by the same inventor, now Patent No. 1,875,849, granted Sept. 6, 1932.

One function of that machine is to accumulate in two accumulators statistical data from a single field of perforated record cards, and to print minor, or subtotals and major, or grand, totals from the two accumulators, under the automatic control of group perforations in the cards. The same amounts are added in two accumulators, one handling minor totals and the other major totals. When a subgroup control designation changes, a total is taken from the subtotal accumulator and that accumulator is cleared or zeroized. The taking of a minor total does not affect the major total accumulator, which continues to add all amounts, regardless of minor group changes, until a major group designation changes, whereupon a major total is taken and the major accumulator cleared, or reset.

Whenever changes of major and minor group designations occur simultaneously, the machine prints either the minor or major total, but does not print both totals, and the principal object of the present invention is to provide improved devices which will enable the machine to print both minor and major totals whenever the minor and major group control designations change at the same time.

Briefly, this result is brought about by first printing the minor total and then, if a major group has changed, causing the machine to perform an extra revolution during which the major total is printed. Each accumulator is reset while its total is being taken.

Figure 1:
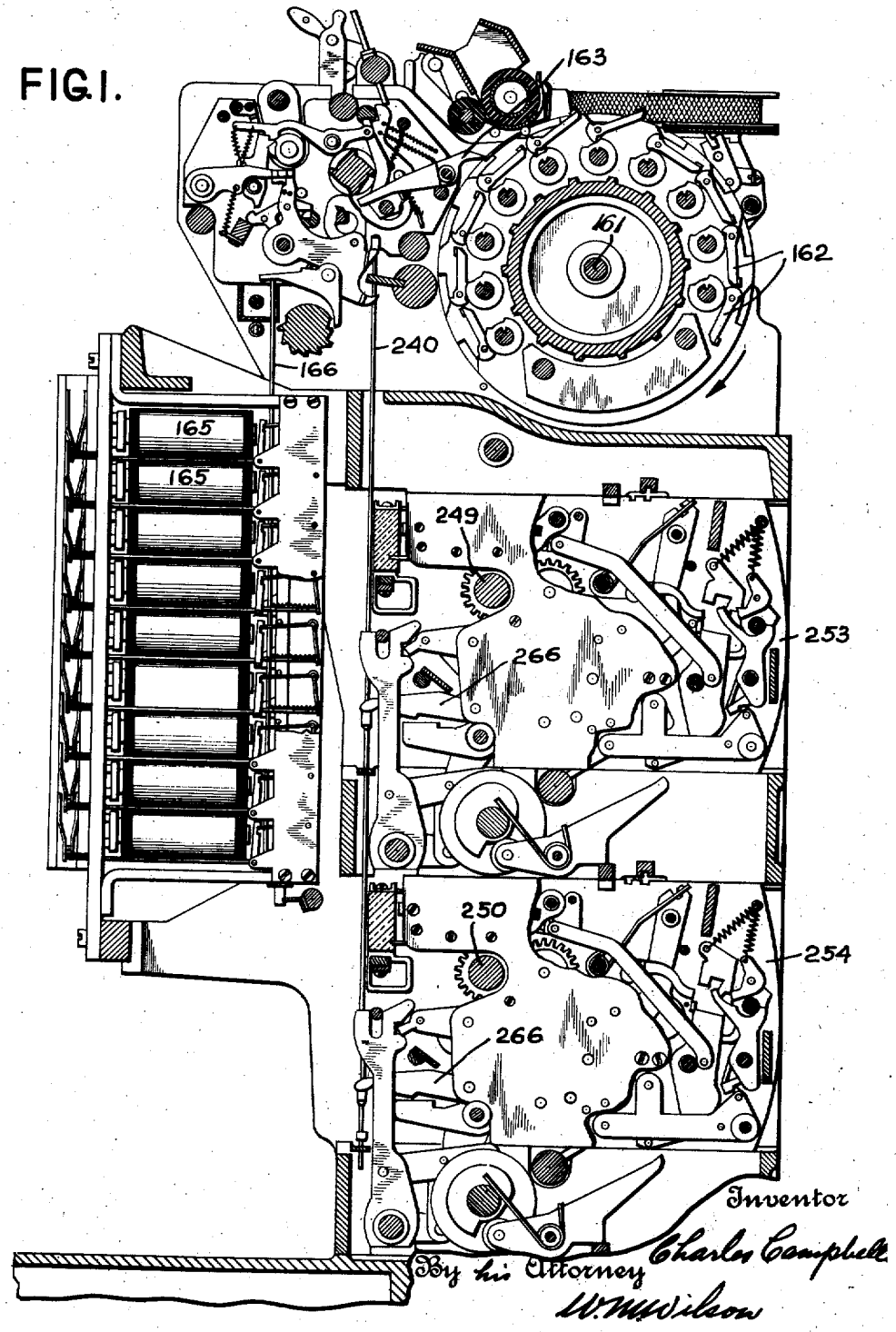
Fig. 1 is a side sectional elevation of the machine, showing accumulators, printing mechanism, etc.

Provision is made for taking major and minor totals from the same records cards. The upper shaft 249 (Fig. 1) drives the major total accumulator, and the lower shaft 250 drives the minor total accumulator.

The accumulators are arranged in two banks, the upper accumulators being designated generally 253 and the lower accumulators being designated generally as 254.

Located above the accumulators is the printing drum carried on shaft 161. The drum carries a number of type levers 162, one row of type levers being provided for each column on the card, and the number of the type levers about the drum periphery corresponding to the index point perforations in the card column. These type levers, when engaged by the controlling hook members 163, cause the type to be thrown upwardly to print on the record sheet on the platen.

To control the operation of the type levers 162 for listing items, call-magnets 165 are provided with individual armatures which control and elevate call-wires 166 which extend upwardly and control the printing devices.

Extending downwardly from the printer control mechanism are call-wires 240, each of which actuates an accumulator element through a member 266 to add on that element the amount printed by the type bars to which that accumulator element is correlated.

All the above mechanism, together with the group control devices, is fully described in the patent and application above referred to. For the purpose of the present description it will be sufficient to know that the group control devices comprise upper and lower sets of contact brushes which simultaneously sense the group control perforations of two successive cards. If the perforations are different in the two cards it means that a change of group has occurred, whereupon the total taking mechanism is brought into action, as will appear.

When a total is to be taken the total clutch magnet 323 is energized and causes vertical shaft 315 to be turned concurrently with the printing drum. Directly below the total-clutch magnet 323 are two magnets 908 and 903, the former being the grand total controlling magnet and the latter a grand-total pre-selecting magnet. The magnet 908 operates upon an armature 326, which armature has an operating connection extending to a clutch sleeve 327 surrounding the vertical shaft 315. The armature 326 is urged downwardly (away from the magnet 908) by a spring 920. When the magnet 908 is energized the clutch 328 is engaged, therby coupling shaft 315 so as to drive a shaft 329 through the skew gearing shown in Fig. 2. When the magnet 908 is deenergized the armature 326 will be moved downwards by compression springs 920, whereby a clutch 330 will be engaged and cause the rotation of a shaft 331.

It may be explained that the so-called total clutch controlled by the total clutch magnet, is a clutch of the one revolution type permitting shaft 315 normally to drive the selected shaft 329 or 331 one revolution only, although, of course, if the magnet 323 is re-energized at the proper times, the shaft 315 may perform more than one successive driving operation.

Beneath the pre-selecting magnet 903 is pivoted an armature 905 (Figs. 2 and 3) normally held in its lower position by a spring 921 and having a forked end which embraces a groove in a double dog-clutch member 940 splined to a vertical shaft 941 mounted to rotate in suitable upper and lower bearing plates. This shaft has secured to it at its lower end a gear-wheel 942 in mesh with an idler 952 which is in mesh with a gear-wheel 962 secured to the lower end of the shaft 315, the gear ratio being 1:1.

The shaft 941 also carries two gear-wheels 943 and 944 provided on their hubs with clutch teeth capable of being engaged by the clutch teeth of the member 940. These wheels 943 and 944 are normally free to rotate upon the shaft 941, and are clutched thereto by the engagement therewith of the clutch member 940, the wheel 943 being so clutched when the magnet 903 is deenergized and the wheel 944 when the magnet is energized, as will be readily understood.

A vertical cam-shaft 950 is mounted in bearings adjacent the shaft 941, and has secured to it two gear-wheels 943*a* and 944*a* in mesh with the wheels 943 and 944, respectively. The ratio of the wheels 943 and 943*a* is 1:1, and the ratio of the other pair is 2:1. Thus when the magnet 903 is deenergized, one revolution of the shaft 315 will cause the cam-shaft 950 to make one revolution, but when the magnet 903 is energized the cam-shaft will only turn through one-half a revolution.

The shaft 950 carries a cam 950*a* of insulating material having one high point which engages and closes momentarily a pair of normally open contacts 478 to be referred to hereinafter. Another pair of normally open contacts 907 are provided which are closed when the magnet 903 is energized by a rod fixed to and extending upwardly from the armature 905.

A third pair of contacts 910 are provided which are closed momentarily, by a cam 909 secured to the shaft 331, just prior to the end of the rotation of the shaft 331.

The parts just described with reference to Figs. 2 and 3 operate to determine whether a sub-total only, or a sub-total followed by a grand total, shall be taken as will hereinafter be described.

The details of the total taking mechanism and its operation are fully explained in the above patent and application, and it will be sufficient for the present purpose to know that shaft 329 is caused to make one revolution when a major total is to be taken, and shaft 331 must make one revolution when a minor total is taken. The total taking operations carried out by shafts 329 and 331 include the resetting of the accumulators.

Figure 4:
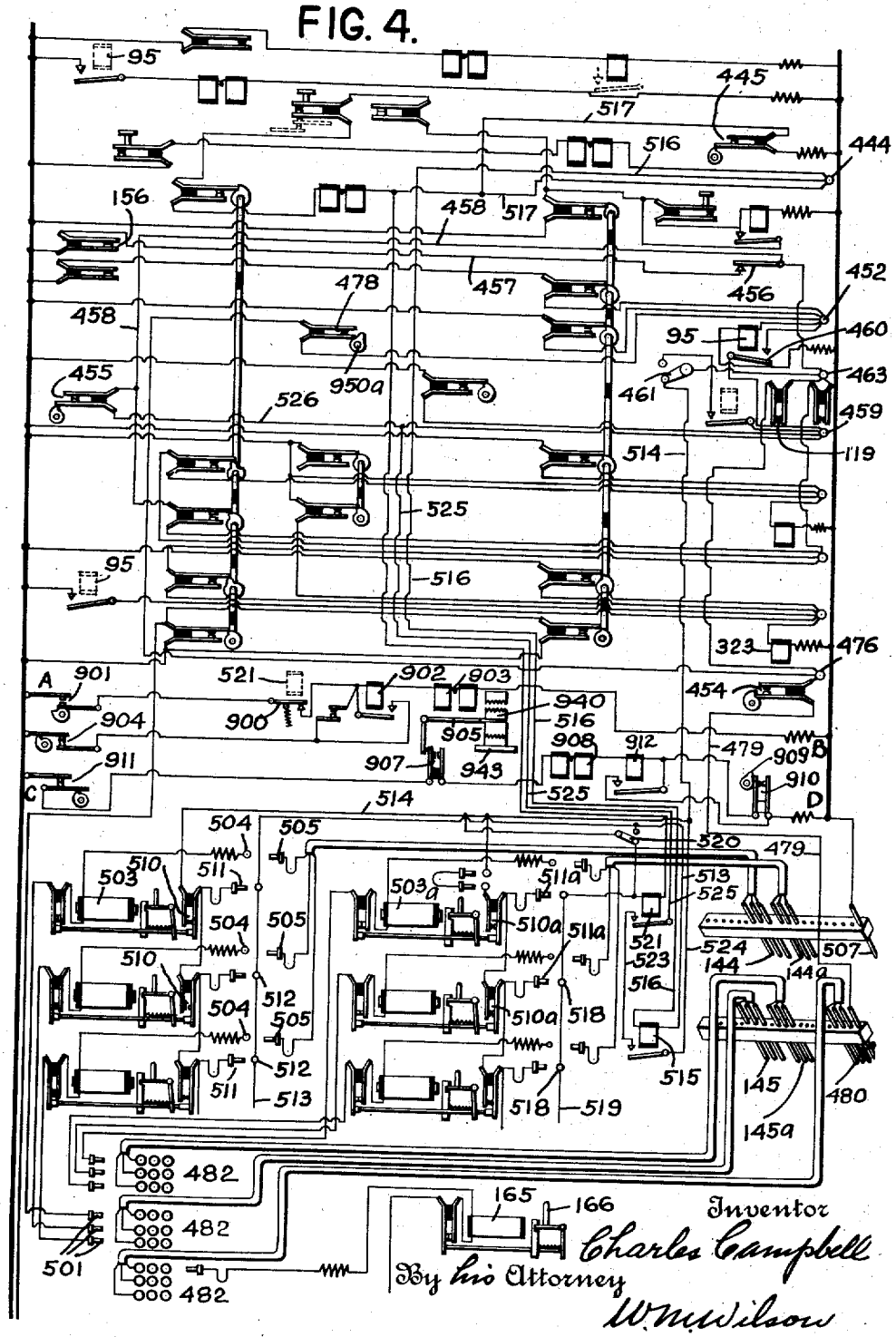
Fig. 4 is a wiring diagram of the electric circuits pertaining to my invention.

In the diagram (Fig. 4) brushes 480 are the tabulating brushes; upper and lower brushes 144 and 145 are the group control brushes for minor groups, while upper and lower brushes 144*a* and 145*a* are for major group control. 503 and 503*a* are the minor and major group control magnets, respectively. 482 is the plug board by means of which desired circuit connections are made.

Magnets 503 may be plugged to lower brushes 145 by means of plugs 501 insertable in sockets connected to these brushes and located on plug board 482. These magnets may be plugged to upper brushes 144 through sockets 504 and plugs 505. As usual each column of automatic control has a magnet connected in series between its upper and lower brushes. The magnet circuits extend as follows: from left side of the line through normally closed contacts 156, through wire 457, stop relay contacts 456 to common junction 463, thence through contacts 119 closed as long as cards are on the drum, to common junction 476, cam contacts 454 and wire 479 to common lower brush 480. The brush 480 supplies current for the lower brushes 145 and 145*a* so that the circuit is continued through perforations in the cards, brushes 145 to plug board 482 and through plugs 501, magnets 503 to sockets 504 and inserted plugs 505 to upper brushes 144 thence to common brush 507 and the right side of the line. The magnets 503*a* selected for the major group automatic control are handled in a similar manner. As long as the controlling perforations in successive cards agree each magnet 503 and 503*a* selected for automatic control is energized at some time during the cycle and contacts 510 and 510*a*, respectively, are closed and remain closed until towards the end of the cycle.

The contacts 510 are connected in series and each pair is provided with a plug 511 which may be inserted in a socket 512 in line 513. Ordinarily only one plug 511 is inserted, this one being chosen to place all the contacts 510 which are involved in minor automatic control in series with line 513. The contacts 510*a* which are involved in major automatic control are similarly plugged in series with a line 519. When operating under major and minor control also the switch 520 should be open.

The contacts 510 now control a relay 515 serving to energize this relay whenever successive cards agree in their minor group perforations. The circuits for this relay extends from the left side of the line to common junction 463 as previously traced, thence through switch 461, line 514, contacts 510 and inserted plug 511 to socket 512, thence through line 513 and relay 515 wire 516 to common junction 444, wire 517 and cam contacts 445 to the right side of the line. The relay 521 is similarly controlled by the major control contacts 510*a*.

So long as the machine is running and successive cards correspond so far as their group designations are concerned, both relays 521 and 515 will be energized. When a change in either a minor or major group occurs, one or the other of these magnets 521, 515 will be deenergized.

It is the relay circuit marked 523 of these two relays 515 and 521 which maintains the energization of the card feed clutch magnet 95. Consequently, after the circuit 523 is broken by either relay, the card feed clutch magnet will become deenergized at the proper time in the cycle and subsequently a minor or major total will be taken, depending upon the energization of the magnets 908, 903, as will be explained.

The card feed clutch circuit after the machine is once in operation extends from the left side of the line through normally closed contacts 156, wire 457, stop relay contacts 456, wire 458, cam contacts 455, wire 526 to common junction 459, thence through relay armature 460 of clutch magnet 95 to common junction point 452 and through card feed clutch magnet 95 to the right side of the line. Contacts 455 are normally closed but open temporarily toward the end of each machine cycle. They therefore tend to deenergize card feed clutch 95 and interrupt card feed at the end of each cycle. It is the object of the automatic control system to prevent this in the absence of a group change. The contacts 455 are therefore shunted by the circuit 523, previously referred to, and controlled by relays 515 and 521. The shunt extends from one side of contacts 455, wires 526 and 525 to contacts of relay 521, thence through circuit 523 and contacts of relay 515 to wires 524 and 514 to switch 461 thence to junction point 463 to stop contacts 456 and wire 458 to the other side of contacts 455. As long as this shunt circuit makes, which is the case whenever relays 515 and 521 are both energized or, in other words, when successive cards agree in group control perforations, the opening of contacts 455 at the end of the cycle is ineffective to deenergize card feed clutch magnet 95 and card feed continues. When either relay 515 or 521 fails to be energized the shunt around contacts 455 fails to be established and the opening of the contacts deenergizes card feed clutch magnet 95 and interrupts card feed incidentally forcing a total taking operation.

The manner in which it is determined whether a sub-total only, or a sub-total and a grand total, shall be printed will first be described.

It should be explained that a sub-total is always required when a grand total is taken, whether the sub-group perforations change or not. For example, there may be two successive main groups representing two railways A and B. Each main group will usually comprise several sub-groups each relating, it may be, to a commodity such as coal or oil If the last sub-group of main group A is coal and the first sub-group of main group B is oil, then the sub-group and main group perforations will change simultaneously. If the last sub-group of A is coal and the first sub-group of B is also coal, then the sub-group perforations will not change. But a sub-group total of A's coal must be taken, and the subgroup accumulator cleared, before the machine re-starts to tabulate B's cards, otherwise A's coal will be added to B's next sub-total.

Consequently, whenever the machine stops as a result of a change of group perforations, whether sub-group or main group or both, a sub-total must be printed, to be followed by a grand total only if the main group perforations have changed.

Figure 2:
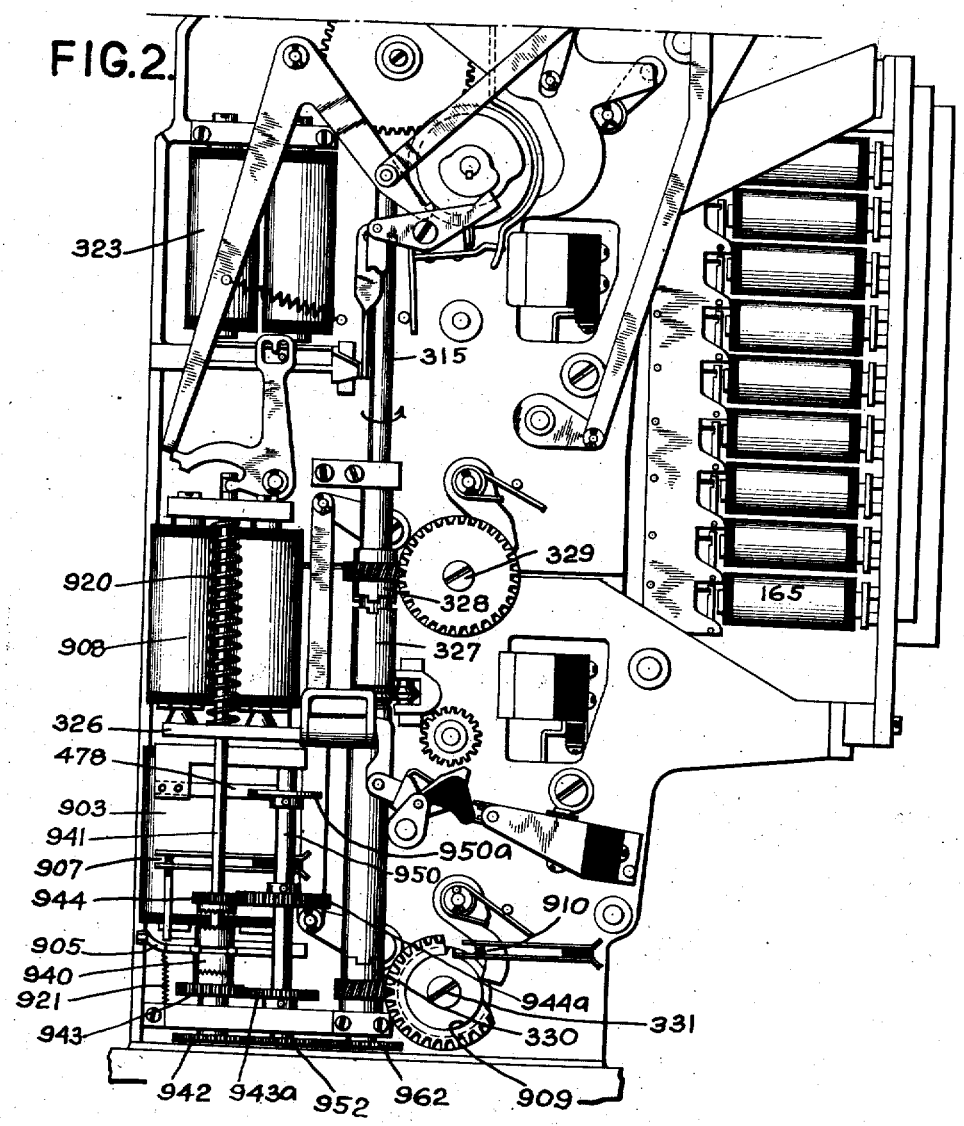
Fig. 2 is a side view of a portion of the other side of the machine, showing the mechanism of my invention as applied to the machine.
Figure 3:
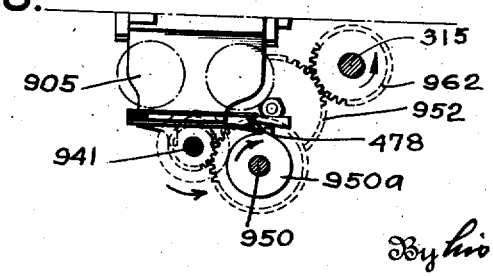
Fig. 3 is a plan view of the mechanism shown in Fig. 2.

Reverting now to Figs. 2 and 3, it will be noted that the springs 920 normally hold the clutch-sleeve 327 in its lower position to clutch the sub-group accumulator shaft 331 to the resetting shaft 315. Only when the magnet 908 is energized is the clutch-sleeve raised by armature 326 to clutch the main group accumulator shaft 329 to the shaft 315. Consequently it is necessary to energize the magnet 908 (when a grand total is to be printed) at the end of one revolution of the shaft 315 and to provide for a second revolution of the latter. If no grand total is to be printed the magnet 908 is not energized and the shaft 315 need only make one revolution.

When a change occurs in the sub-group perforations only, the magnet 515 (Fig. 4) is deenergized and consequently the card-feed is stopped as previously described and cams, known for convenience as E cams, function to cause the total-taking and resetting shaft 315 to rotate, as is fully described in the above mentioned patent and application. As the main group perforations have not changed, the magnet 521 is energized and attracts an armature 900 (Fig. 4), thereby opening a circuit A—B in which is placed the winding of the magnet 903 shown in Fig. 2 and known as the grand total pre-selecting magnet. The armature 905 of this magnet therefore remains in its lower position, retaining the clutch-member 940 in engagement with the gear-wheel 943. Consequently the cam-shaft 950 rotates once during the single revolution of the shaft 315. As will be seen from Fig. 4, the winding of the grand-total controlling magnet 908 (which must be energized as already stated to take a grand total) is in a circuit C—D containing the contacts 907 which are closed only when the magnet 903 is energized. Consequently the magnet 908 will not be energized, the sleeve 327 will remain in its lower position and only a sub-total will be taken. Just prior to the end of the single revolution of the shafts the cam 909 closes the contacts 910 in the circuit C—D, but as the contacts 907 remain open the magnet 908 remains nevertheless deenergized.

The cam 950*a* will close the contacts 478 at the end of the single revolution thereby re-energizing the card-feed clutch-magnet and stopping the action of the E cams, as previously described, and the machine will continue on the next sub-group of cards. It will be noted that only one total taking and resetting cycle has been performed.

Should the main group perforations change, but not the sub-group perforations, the magnet 521 will be deenergized (stopping the card-feed as previously explained) and the armature 900 will not be attracted. There will therefore be a circuit from A through cam contacts 901 (closed just prior to the stoppage of the card-feed) contacts 900, relay 902, grand-total preselecting magnet 903 to B, this circuit being maintained by the closure of contacts 904 (prior to the stoppage of the card-feed) and armature of relay 902.

The energized magnet 903 will raise its armature 905, closing the contacts 907 and throwing the clutch-member 940 into engagement with the gear-wheel 944. The sleeve 327 being still in its lower position and the shaft 331 in gear with the shaft 315, the ensuing rotation of the latter will bring about a taking of a sub-total, as before. At the end of this rotation, however, the cam-shaft 950 will have made only a half-revolution, since the gear-wheels 944, 944*a* have a 2:1 ratio. Consequently, the contacts 478 will still be open.

But the contacts 910 will be closed at the end of the revolution of the shaft 315 as before. The contacts 907 being closed, the circuit C—D through the winding of the grand-total controlling magnet 908 will be completed, thus raising the clutch-sleeve 327 and placing the grand-total accumulator shaft 329 in gear with the shaft 315; this circuit C—D being held closed (in spite of the re-opening of contacts 910) by a holding relay 912, as will be apparent from Fig. 4. Since the contacts 478 are still open, the E cams will still function and a second revolution of the shaft 315 will occur, thus taking a grand total. At the end of this second revolution the cam 950*a* will close the contacts 478 momentarily and thereby re-energize the card-feed clutch magnet 95, thus starting a new tabulating operation on the cards of the next main group and stopping the action of the E cams.

The cam-contacts 911 will thereupon open, thus deenergizing the magnet 908 and the relay 912, and the armature 326 will cease to be attracted. Consequently the spring 920 will return the clutch-sleeve 327 to its lower position, thus disengaging the grand-total accumulator and placing the sub-total accumulator in gear with the shaft 315 in readiness for the next sub-total taking operation.

Further, as soon as the card-feed is resumed, the cam contacts 904 will open, thus deenergizing the holding relay 902 and the pre-selecting magnet 903, the armature 905 will be returned to normal by its spring 921 and the clutch-member 940 will move out of engagement with the gear wheel 944 and re-engage with the gear wheel 943. All the parts are therefore returned to their original position in readiness for the taking of the next sub-total.

It will be apparent that if the sub-group perforations change at the same time as the main-group perforations the sequence of operations will be the same as has been described for a change of main-group perforations only, since a change of sub-group perforations does not alter the position of the clutch-sleeve 327—that is to say, a sub-total will first be taken and afterwards a grand total, followed by a return of all the parts to normal.

I claim:

1. In a machine of the class described, in combination, devices for sensing major and minor group designations, means for accumulating major and minor group totals, and means controlled by the major group sensing device for printing minor group totals whenever major group designations change.

2. In a machine of the class described, in combination, devices for sensing major and minor group designations, means for accumulating major and minor group totals, means controlled by the major group sensing device for printing both major and minor totals whenever major group designations change, and means automatically brought into operation upon a change in major group designations for delaying the printing of the major total until the minor totals has been printed.

3. In a machine of the class described, in combination, devices for sensing major and minor group designations, means for accumulating major and minor group totals, a resetting member common to both accumulators, and means operable when a major group designation changes to cause said resetting member to first reset said minor group accumulator and then reset major group accumulator.

4. In a machine of the class described, in combination, devices for sensing major and minor group designations, means for accumulating major and minor group totals, means controlled by the major group sensing device for printing minor group totals whenever major group designations change, and means also effective upon a change of major group designations for effecting the further printing of a major group total.

5. A machine having means for sensing minor and major group designations, means for accumulating major and minor group totals, means controlled by the minor group sensing devices upon a change of a minor group designation for effecting the printing of a minor group total, and means controlled by the major group sensing means irrespective of a concurrent change of a minor group designation for effecting the subsequent printing of a major group total.

6. In a machine of the class described, in combination, devices for sensing major and minor group designations upon record cards, means for accumulating major and minor group totals, means under control of the minor group sensing devices for printing minor group totals, and means effective for operation upon a change of a major group designation for printing both a major group total and a minor group total.

7. In a machine of the class described, in combination, devices for sensing major and minor group designations upon record cards, means for accumulating major and minor group totals, means under the control of the major group sensing devices for printing a minor group total and for thereafter printing a major group total.

8. In a machine of the class described having sensing devices for sensing both a minor and major group designation, multiple accumulator devices for accumulating major and minor group totals, and means effective upon the sensing of a change in major group designations and operating irrespective of the sensing of the minor group designation for effecting two printing operations by the machine, said means effecting the printing of a minor group total followed by the printing of a major group total.

9. In a machine of the class described, in combination, devices for sensing major and minor group designations upon record cards, and means for separately accumulating major and minor group totals, and means under the control of certain of the aforesaid sensing devices and effective upon a change of certain group designations for effecting an automatic sequential total printing operation by the machine; said means including devices for first taking a total from one accumulator containing the total of one of the groups and for thereafter taking a total from another accumulator containing a total of another group.

10. An accounting machine including, in combination, electric means for analyzing perforated records, a plurality of counters to set up totals derived from the records, means for automatically taking totals successively from more than one of said counters, and electric devices controlled by the records for selecting the counter from which a total is to be taken.

11. A record controlled accounting machine including, in combination, a plurality of accumulators, electric instrumentalities for automatically taking totals successively from said accumulators and record controlled means for initiating the automatic succession of total taking operations.

12. A record controlled accounting machine including, in combination, a plurality of accumulators, electric instrumentalities for automatically taking totals successively from said accumulators, and electric means controlled by the records for selecting the counters from which totals are to be taken.

13. A record controlled tabulator including, in combination, a plurality of counters, electric instrumentalities for automatically taking totals successively from said counters, electric means controlled by the records for selecting the counters from which totals are to be taken and means operable conjointly with the aforesaid means and controlled by the records for initiating the total-taking operations therefrom.

14. A record controlled accounting machine comprising, in combination, a plurality of accumulators, automatically controlled analyzing means to analyze major and minor groups of perforations on records, and means controlled by the analyzing means in accordance with changes in major and minor group perforations on the records for selecting different running operations of the machine, which operations always involve uninterrupted operation of the machine when major and minor group control numbers change irrespective of simultaneous or successive change of control numbers.

15. A record controlled accounting machine comprising, in combination, electrical analyzing means for reading amounts from records and for analyzing major and minor group designations thereon, a plurality of accumulators electrically controlled by the analyzing means for accumulating totals of such amounts, and electrical means controlled by the analyzing means in accordance with changes in the major and minor group designations on the records for initiating various running operations of the machine, which operations always involve uninterrupted operation of the machine, when control numbers in the major and minor group designations change irrespective of simultaneous or successive change thereof.

16. A record controlled accounting machine having a plurality of counters, and means controlled by records for entering items to be accumulated therein, means for automatically taking a succession of printed totals from said counters, and means controlled by the records for predetermining and selecting the counters from which totals are to be taken.

17. A tabulating machine including, in combination, a plurality of counters, a device for printing totals accumulated by said counters, automatic means for bringing about successive total-printing operations from a plurality of counters, and selective means controlling the selection of the counter from which an automatic totaling is to be effected.

18. A record controlled accounting machine comprising, in combination, a plurality of accumulators, means for accumulating in said accumulators totals of successive items derived from the records, and means controlled by the records for taking in a single run the total from one or all of said accumulators, said totals being all taken between entries of successive items from the records.

19. The invention set forth in claim 18 in which total-taking devices include sequentially acting devices for successively taking the various totals.

20. A tabulating machine with means for accumulating items from records, some of which include records having major and minor group designations thereon, and means controlled by the major and minor group designations upon the records whenever the control designation of a certain group changes for automatically printing totals of all of said groups, said means being also controlled irrespective of whether or not a plurality of changes of group control designations occur simultaneously, for printing the totals of any of said groups.

21. A tabulating machine with means for accumulating items derived from records arranged in two distinct groups, means for automatically printing totals of any of said groups whenever the control designation of that group changes, and means effective whenever a certain group designation change occurs, to determine whether or not the total of the other group is ready to be taken.

22. A tabulating machine with means for accumulating items derived from records arranged in two distinct groups, means for printing totals of either of said groups whenever the control designation of that group changes, and means effective whenever a certain group designation change occurs, to determine whether or not the total of the other group is ready to be taken, and if ready, to cause said other total to be automatically taken.

23. A record controlled accounting machine, comprising, in combination, means to accumulate totals of amounts derived from cards arranged in groups and having several group control designations on each card, total taking means controlled by the group designations for determining which totals are to be taken and for automatically effecting a plurality of total taking operations sequentially when simultaneous changes in the group control designations call for a plurality of totals and means controlled by the accumulating means during such sequential total taking operations to print totals of the groups.

24. An accounting machine comprising, in combination, a plurality of accumulators, means for causing one of the accumulators to accumulate in one total the amounts constituting a series of separate totals accumulated from items entered in the other accumulator, a driving mechanism for actuating said means, and devices brought into operation automatically after the last item is entered in the accuumlators for automatically printing all of the totals from all of the accumulators which have received entries.

25. A record controlled accounting machine having a plurality of accumulators and total printing devices therefor, selective means for appropriating, at will, one of said accumulators to sub-totaling operations and another to grand-totaling operations and means, controlled by records, for automatically, by the operation of the machine, selectively effecting either sub-total printing operations alone from the accumulator appropriated to this operation or both sub- and grand-total printing operations from the accumulators appropriated to both of these operations.

26. The invention set forth in claim 25, in which record-controlled means is provided for deciding whether a sub- or grand totalizing printing operation is to be effected, and in which means is provided for initiating such printing operation upon the decision being made.

27. A tabulating machine comprising recording mechanism, a control unit including a control circuit controlled by group control perforations in records, means in said unit for splitting the control circuit thereof into separate sections for separate and independent controlling purposes, and a plurality of control devices associated with the split sections of said control circuit for automatically effecting a single operation of said recording device on a change in control perforations in records affecting one section of the control circuit and for automatically effecting a plurality of operations of said recording device on a change in control perforations in records affecting another section of the control circuit.

28. A tabulating machine having a control unit with means therein controlled by the control designating perforations of record cards and means for splitting said unit to effect a plurality of separate controlling operations of the machine, which operations all involve uninterrupted operation of the machine and are distinctive each to the other and correspond with changes in different control numbers upon the record cards themselves.

29. An accounting machine comprising a plurality of accumulators and total taking mechanism, means for selecting said accumulators for sequential total taking and means for operating the total taking mechanism to take totals from the selected accumulators in uninterrupted succession and to interrupt the operation of the total taking mechanism after the last successive total taking operation.

30. An accounting machine comprising a plurality of accumulators and total taking devices for the same, means for selecting one or more than one of said accumulators for total taking, and mechanism for operating said total taking devices to take a total during a single operation of the same when one accumulator only is selected for total taking and to take totals from the selected accumulators in uninterrupted succession when more than one is selected, said mechanism including means to interrupt the operation of the total taking devices directly after the required number of total taking operations have occurred.

31. An accounting machine comprising a plurality of accumulators and resetting means for the same, means for selecting one or more than one of said accumulators for reset and mechanism for operating said resetting means to reset one accumulator by a single operation of the resetting means when one only is selected for reset and to reset the selected accumulators in uninterrupted succession when more than one is selected, said mechanism including means to interrupt the operation of the resetting means directly after the required number of resetting operations have occurred.

32. An accounting machine comprising a plurality of accumulators adapted to receive and totalize items of classifications bearing a serial relationship to each other, total taking mechanism and means for operating the same to take totals successively from the plurality of accumulators in the order of their serial relationship, each with a separate total taking operation and means for limiting the number of total taking operations to the actual number of totals to be taken.

33. An accounting machine comprising a plurality of accumulators adapted to receive and totalize items of different classifications bearing a serial relationship to each other, total taking mechanism and means for operating the same to take totals from the plurality of accumulators in the order of their serial relationship, means associated with each accumulator to initiate a total taking operation on the same and means controlled thereby for initiating a sequential total taking operation on the next accumulator in order.

34. An accounting machine comprising a plurality of accumulators adapted to receive and totalize items of different classifications bearing a serial relationship to each other, total taking mechanism and means for operating the same to take totals successively from the plurality of accumulators, comprising means associated with an accumulator to initiate a total taking operation on the same and means associated with said accumulator for initiating a sequential total taking operation on another accumulator corresponding to the adjacent classification order.

35. A tabulator comprising a plurality of record controlled accumulators adapted to receive and totalize items of different classifications, total taking mechanism for taking totals from the plurality of accumulators successively by repeated total taking operations and record controlled means for selecting the accumulators from which totals are to be taken and for limiting the number of repeated total taking operations to the actual number of accumulators selected.

36. A split automatic control system for a record controlled accounting machine, which includes accumulating mechanism and total taking mechanism, comprising means for operating upon records bearing classification data divided into sections to interrupt operation of the accumulating mechanism and condition the total taking mechanism for successive totals on a change of classification data and means for selecting the number of successive total taking operations according to the section in which the classification data changes.

37. A split automatic control system for a record controlled accounting machine, which includes cyclically operable total taking mechanism comprising means for operating upon records bearing classification data in sections and means controlled thereby to call into operation said total taking mechanism for different numbers of operating cycles according to changes of classification data in the different sections.

38. A split automatic control system for a record controlled accounting machine comprising means for operating upon records bearing classification data arranged in ranked sections, an accumulator corresponding to each section and means operable upon a change in classification data in any section for taking a total from the accumulator corresponding to that section and the accumulator corresponding to the classification section of lower rank.

39. A split automatic control system for a record controlled accounting machine comprising means for operating upon records bearing classification data arranged in ranked sections, an accumulator corresponding to each section and means operable upon a change in classification data in any section for taking totals successively from the accumulators corresponding to the classification section in which the change occurs and the accumulator of lower rank.

40. A split automatic control system for a record controlled accounting machine comprising means for operating upon records bearing classification data arranged in ranked sections, a pair of accumulators, one accumulator corresponding to each section and means operable upon a change in classification data in any section to initiate successive uninterrupted total taking operations on the accumulators beginning with that corresponding to the lowest rank classification section and ending with the accumulator corresponding to the classification section in which the change occurs.

41. A split automatic control system for a record controlled accounting machine comprising means for operating upon records bearing classifications data arranged in ranked sections, a pair of accumulators, one accumulator corresponding to each classification section, means operable upon a change in classification data in any section to effect successive total taking operations on the accumulators, beginning with that of the lowest rank and means for interrupting the series of total taking operations after a total has been taken from the accumulator corresponding to the classification section in which the change occurs.

In testimony whereof I hereto affix my signature.

CHARLES CAMPBELL.